US012683843B2

(12) United States Patent
Zhang et al.

(10) Patent No.: US 12,683,843 B2
(45) Date of Patent: Jul. 14, 2026

(54) JOINT COMMUNICATION AND SENSING METHOD AND RELATED USER EQUIPMENT FOR ORTHOGONAL FREQUENCY DOMAIN MULTIPLEXING COMMUNICATION SYSTEM

(71) Applicant: MEDIATEK INC., Hsin-Chu (TW)

(72) Inventors: Rui Zhang, San Jose, CA (US);
Shiauhe Tsai, San Jose, CA (US);
Jiaying Ren, San Jose, CA (US)

(73) Assignee: MEDIATEK INC., Hsinchu City (TW)

( * ) Notice: Subject to any disclaimer, the term of this patent is extended or adjusted under 35 U.S.C. 154(b) by 277 days.

(21) Appl. No.: 18/593,991

(22) Filed: Mar. 4, 2024

(65) Prior Publication Data

US 2024/0314008 A1    Sep. 19, 2024

Related U.S. Application Data

(60) Provisional application No. 63/489,787, filed on Mar. 13, 2023.

(51) Int. Cl.
*H04L 27/26* (2006.01)

(52) U.S. Cl.
CPC .... *H04L 27/26025* (2021.01); *H04L 27/2607* (2013.01)

(58) Field of Classification Search
CPC ...................... H04L 27/26025; H04L 27/2607
See application file for complete search history.

(56) References Cited

U.S. PATENT DOCUMENTS

| | | | |
|---|---|---|---|
| 2022/0271982 A1* | 8/2022 | Alawieh | H04L 27/2613 |
| 2022/0337365 A1 | 10/2022 | Munier | |
| 2022/0417896 A1 | 12/2022 | Akkarakaran | |
| 2024/0283581 A1* | 8/2024 | Eberlein | H04L 27/2602 |
| 2024/0297814 A1* | 9/2024 | Zhang | H04L 5/0048 |

FOREIGN PATENT DOCUMENTS

WO    WO-2021071581 A1 *    4/2021    .......... H04W 64/006

OTHER PUBLICATIONS

Ceyhun D. Ozkaptan et al., "OFDM Pilot-Based Radar for Joint Vehicular Communication and Radar Systems", Taipei, Taiwan, pp. 1-8, 2018 IEEE Vehicular Networking Conference (VNC), doi: 10.1109/VNC.2018.8628347, 2018.[https://ieeexplore.ieee.org/document/8628347].

* cited by examiner

*Primary Examiner* — Erika A Washington
(74) *Attorney, Agent, or Firm* — Winston Hsu

(57) ABSTRACT

A joint communication and sensing method for an orthogonal frequency domain multiplexing (OFDM) communication system, includes determining a staggering offset format for an OFDM reference signal (RS) symbol; and eliminating a time delay ambiguity in a two-dimension (2D) range with the determined staggering offset format; wherein the OFDM RS symbol is of a comb structure.

12 Claims, 6 Drawing Sheets

Staggering scheme A : p =1

Staggering scheme B

JOINT COMMUNICATION AND SENSING METHOD AND RELATED USER EQUIPMENT FOR ORTHOGONAL FREQUENCY DOMAIN MULTIPLEXING COMMUNICATION SYSTEM

CROSS REFERENCE TO RELATED APPLICATIONS

This application claims the benefit of U.S. Provisional Application No. 63/489,787, filed on Mar. 13, 2023. The content of the application is incorporated herein by reference.

BACKGROUND

The reference signal configuration is vital in conventional sensing performance when the orthogonal frequency domain multiplexing (OFDM) is applied to joint communication and sensing, especially for bi-static sensing. However, depending on the reference signal patterns, the ambiguity properties in delay (i.e., distance) and the Doppler frequency (i.e., velocity) domain are different.

SUMMARY

In light of this, the present invention provides a joint communication and sensing method and related user equipment (UE) for an orthogonal frequency domain multiplexing (OFDM) communication system to improve the ambiguity performance of sensing algorithms and suggest different staggering schemes for the sensing algorithms and application scenarios.

An embodiment of the present invention provides a joint communication and sensing method for an orthogonal frequency domain multiplexing (OFDM) communication system, comprises determining a staggering offset format for an OFDM reference signal (RS) symbol; and eliminating a time delay ambiguity in a two-dimension (2D) range with the determined staggering offset format; wherein the OFDM RS symbol is of a comb structure.

Another embodiment of the present invention provides a user equipment (UE) of an orthogonal frequency domain multiplexing (OFDM) communication system, comprises a wireless transceiver, configured to perform wireless transmission and reception to and from a service network; and a controller, configured to determine a staggering offset format for an OFDM reference signal (RS) symbol; and eliminate a time delay ambiguity in a two-dimension (2D) range with the determined staggering offset format; wherein the OFDM RS symbol is of a comb structure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
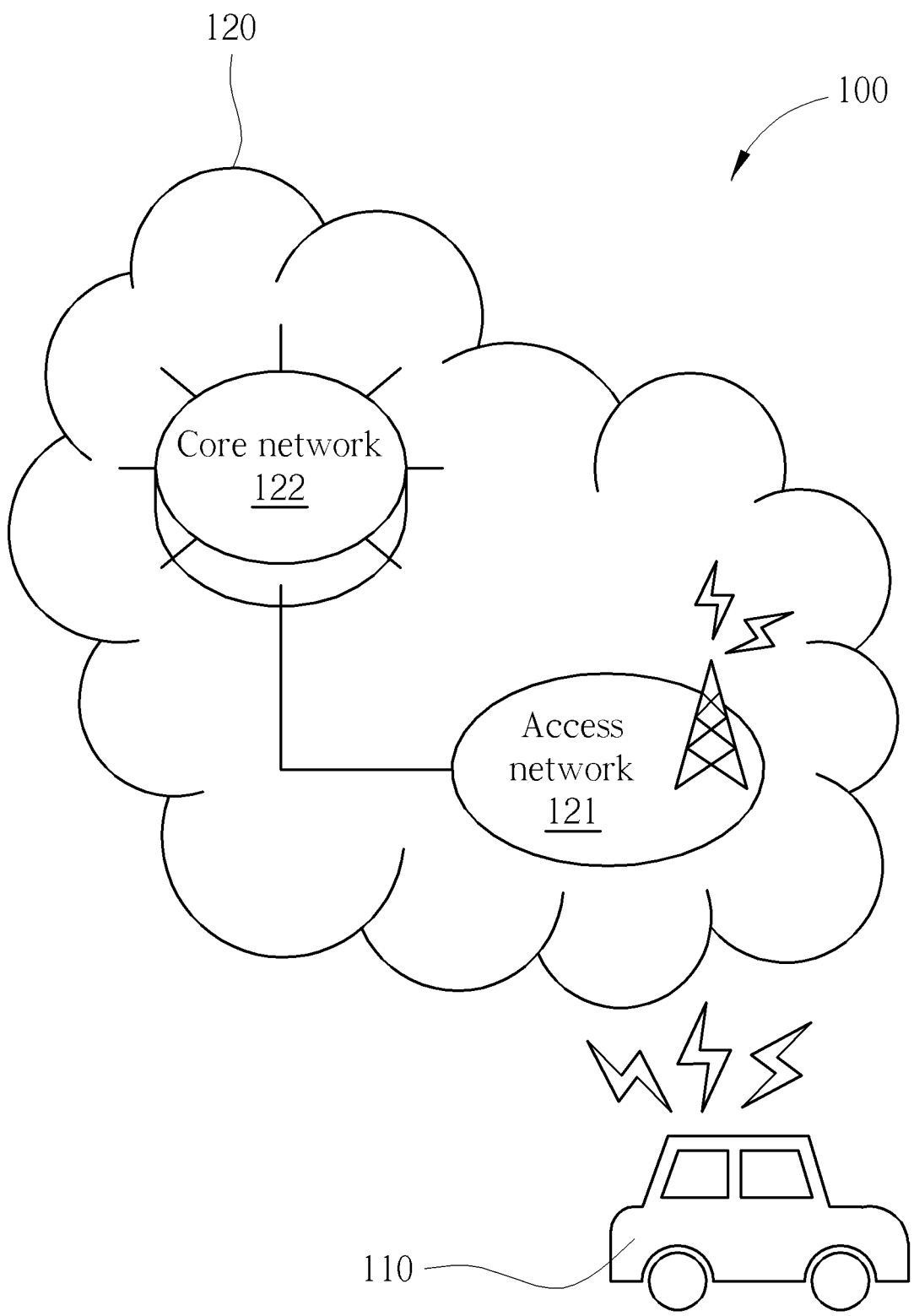
FIG. 1 is a schematic diagram of a wireless communication network according to an embodiment of the present invention.

FIG. 1 is a schematic diagram of a wireless communication network 100 according to an embodiment of the present invention.

As shown in FIG. 1, the wireless communication network 100 may include a user equipment (UE) 110 and a service network 120, wherein the UE 110 may be wirelessly connected to the service network 120 for obtaining mobile services and performing cell measurements to the cell (s) of the service network 120.

The UE 110 may be a feature phone, a smartphone, a panel Personal Computer (PC), a laptop computer, a moving vehicle or any wireless communication device supporting the wireless technology (e.g., the 5G NR technology) utilized by the service network 120. In another embodiment, the UE 110 may support more than one wireless technology. For example, the UE may support the 5G NR technology and a legacy 4G technology, such as the LTE/LTE-A/TD-LTE technology.

The service network 120 includes an access network 121 and a core network 122. The access network 121 is responsible for processing radio signals, terminating radio protocols, and connecting the UE 110 with the core network 122. The core network 122 is responsible for performing mobility management, network-side authentication, and interfaces with public/external networks (e.g., the Internet). Each of the access network 121 and the core network 122 may comprise one or more network nodes for carrying out said functions.

In one embodiment, the service network 120 may be a 5G NR network, and the access network 121 may be a Radio Access Network (RAN) and the core network 122 may be a Next Generation Core Network (NG-CN).

A RAN may include one or more cellular stations, such as next generation NodeBs (gNBs), which support high frequency bands (e.g., above 24 GHz), and each gNB may further include one or more Transmission Reception Points (TRPs), wherein each gNB or TRP may be referred to as a 5G cellular station. Some gNB functions may be distributed across different TRPs, while others may be centralized, leaving the flexibility and scope of specific deployments to fulfill the requirements for specific cases.

A 5G cellular station may form one or more cells with different Component Carriers (CCs) for providing mobile services to the UE 110. For example, the UE 110 may camp on one or more cells formed by one or more gNBs or TRPs, wherein the cells which the UE 110 is camped on may be referred to as serving cells, including a Primary cell (Pcell) and one or more Secondary cells (Scells).

An NG-CN generally consists of various network functions, including Access and Mobility Function (AMF), Session Management Function (SMF), Policy Control Function (PCF), Application Function (AF), Authentication Server Function (AUSF), User Plane Function (UPF), and User Data Management (UDM), wherein each network function may be implemented as a network element on a dedicated hardware, or as a software instance running on a dedicated hardware, or as a virtualized function instantiated on an appropriate platform, e.g., a cloud infrastructure.

The AMF provides UE-based authentication, authorization, mobility management, etc. The SMF is responsible for session management and allocates Internet Protocol (IP) addresses to UEs. It also selects and controls the UPF for data transfer. If a UE has multiple sessions, different SMFs may be allocated to each session to manage them individually and possibly provide different functions per session. The AF provides information on the packet flow to PCF responsible for policy control in order to support Quality of Service (QoS). Based on the information, the PCF determines policies about mobility and session management to make the AMF and the SMF operate properly. The AUSF stores data for authentication of UEs, while the UDM stores subscription data of UEs.

In another embodiment, the service network 120 may be an LTE/LTE-A/TD-LTE network, and the access network 121 may be an Evolved-Universal Terrestrial Radio Access Network (E-UTRAN) and the core network 122 may be an Evolved Packet Core (EPC).

An E-UTRAN may include at least one cellular station, such as an evolved NodeB (eNB) (e.g., macro eNB, femto eNB, or pico eNB), each of which may form a cell for providing mobile services to the UE 110. For example, the UE 110 may camp on one or more cells formed by one or more eNBs, wherein the cells which the UE 110 is camped on may be referred to as serving cells, including a Pcell and one or more Scells.

An EPC may include a Home Subscriber Server (HSS), Mobility Management Entity (MME), Serving Gateway (S-GW), and Packet Data Network Gateway (PDN-GW or P-GW).

It should be understood that the wireless communication network 100 described in the embodiment of FIG. 1 is for illustrative purposes and is not intended to limit the scope of the application. For example, the wireless communication network 100 may include both a 5G NR network and a legacy network (e.g., an LTE/LTE-A/TD-LTE network, or a WCDMA network), and the UE 110 may be wirelessly connected to both the 5G NR network and the legacy network.

An embodiment of the present invention derives the criteria of choosing reference signal patterns using different sensing algorithms and applies the derived principles to either new 6G joint communication sensing, or improvement over existing 5G NR, RS patterns.

Figure 2:
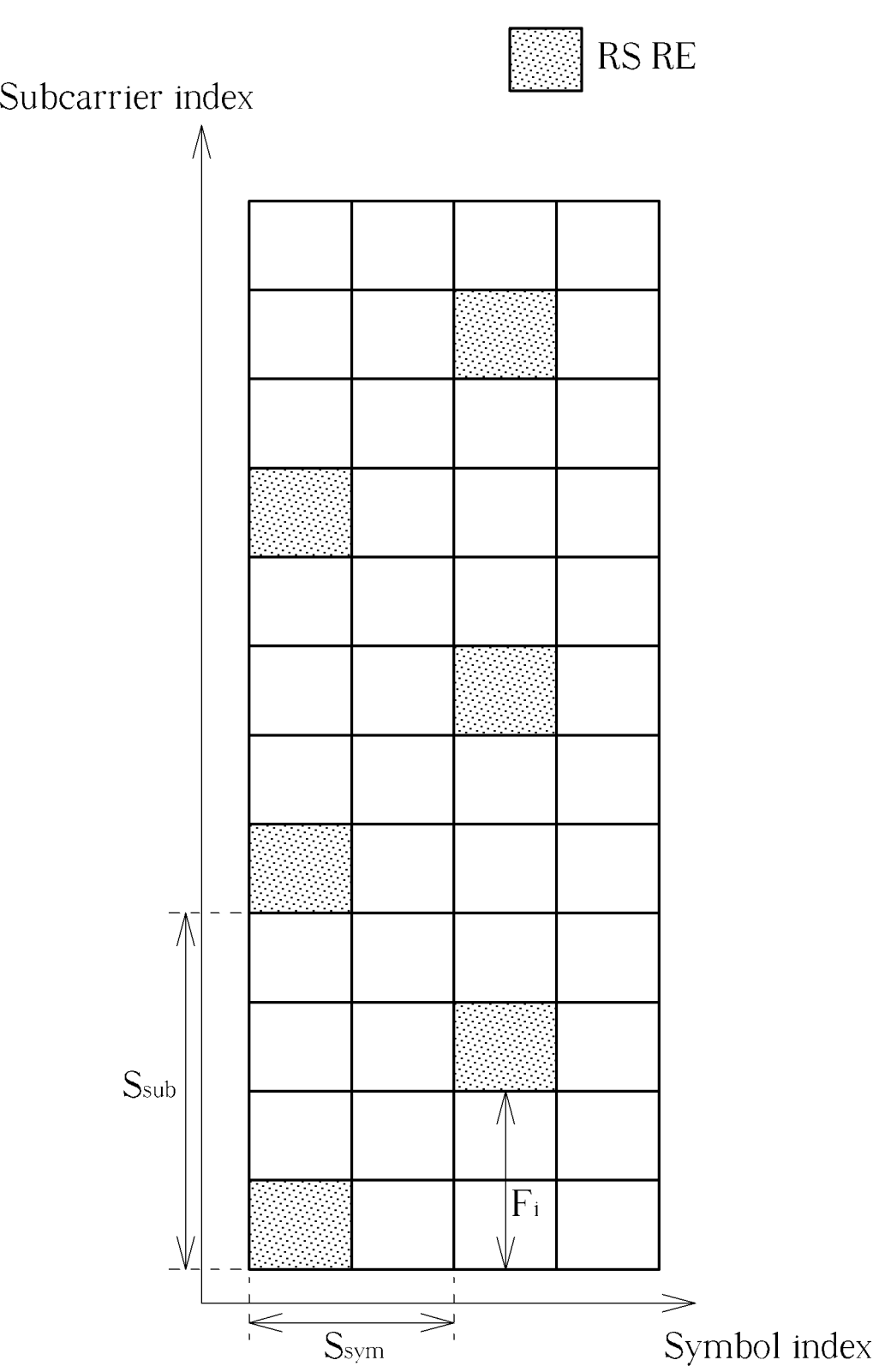
FIG. 2 is a schematic diagram of a comb structure of an RS pattern according to an embodiment of the present invention.

Please refer to FIG. 2, which is a schematic diagram of a comb structure of an RS pattern according to an embodiment of the present invention. The RS pattern includes a plurality of RS resource elements (RE).

Let $S_{sub}$ unit in subcarrier numbers denote a spacing of non-zero REs in a frequency domain, $S_{sym}$ unit in symbol numbers denote a spacing of the RS symbols in a time domain, and $F_i$ unit in subcarrier numbers be a staggering offset in the frequency domain of the $i_{th}$ RS symbol. Then, the OFDM samples could be divided into $S_{sub}$ subsets, e.g., $S_{sub}$=4, four subsets as shown in FIG. 2. The RS patterns may be tuned by $S_{sub}$, $S_{sym}$ and $F_i$.

Figures 3A, 3B, 3C:
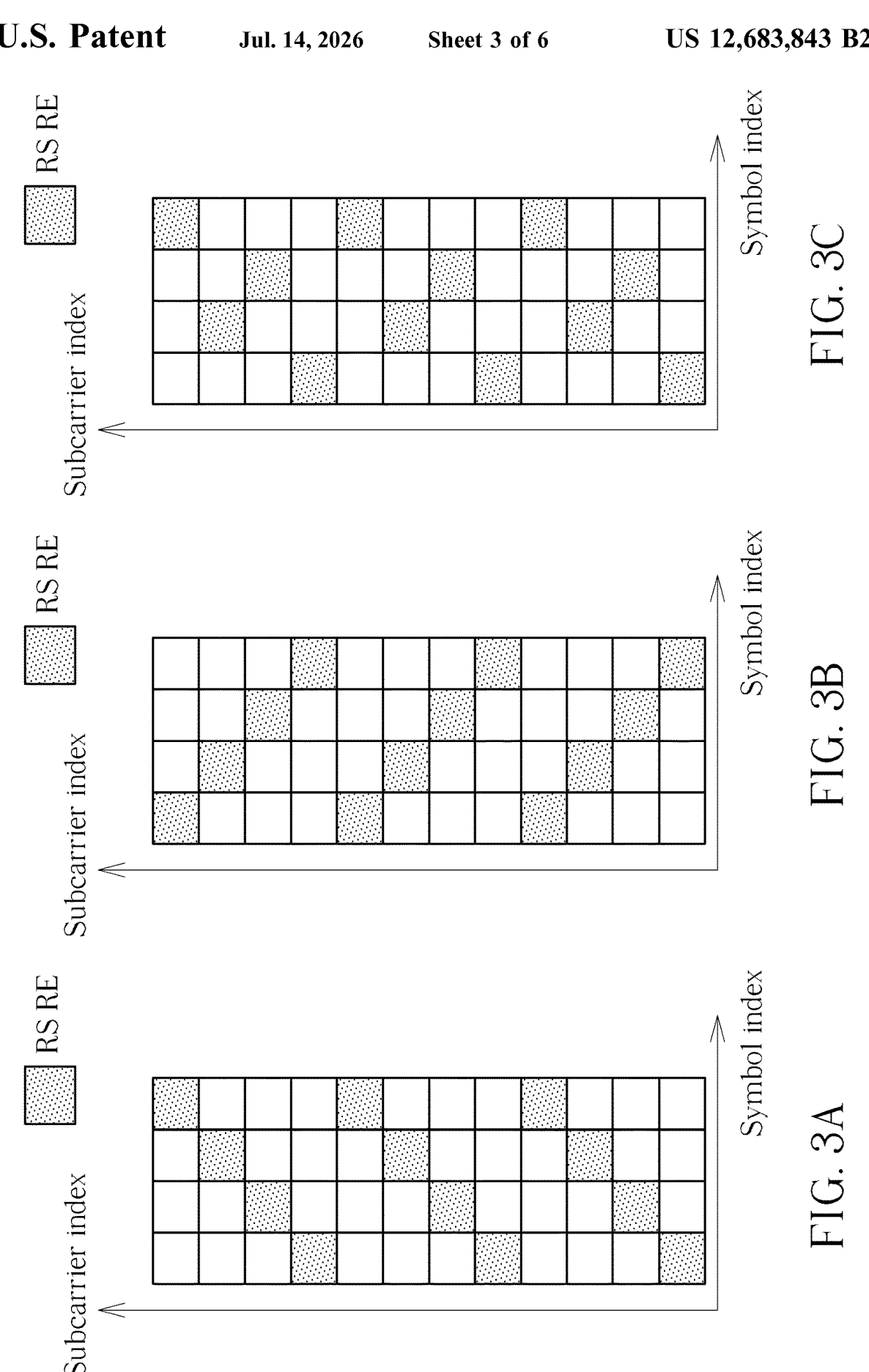
FIGS. 3a, 3b, 3c are schematic diagrams of different comb structures of the RS pattern according to an embodiment of the present invention.

To support a scenario that needs a high sensing dynamic range in the OFDM communication system, a delay and sum algorithm or a matched filter with frequency binning and periodogram-based algorithms, such as 2D FFT, may adopt the configuration of FIGS. 3a and 3b to support the extended 2D unambiguous ranges.

On the other hand, the RS pattern configuration shown in FIG. 3c may be adopted with an extended 2D unambiguous range in the time delay and Doppler frequency domain by slicing off some side peaks with lower power, which sacrifices the sensing dynamic range of detectable target signal strength.

For the delay and sum (matched filter with frequency binning) and 2D FFT, the staggering offset for different RS symbols eliminates the time delay ambiguities in certain 2D ranges. Defining mod(Z, $S_{sub}$) ∈ {0, 1, . . . $S_{sub}$−1} for any integers Z, where mod is modulo operation, two types of staggering formats are as below:

Staggering scheme A: staggering offset such that $F_i$=mod (p·i+$\beta_1$, $S_{sub}$), where p is relative prime to $S_{sub}$ and $B_1$ ∈ {0, 1, . . . $S_{sub}$−1}, i=0, 1, . . . .

Staggering scheme B: staggering offset such that $F_i$ sequence is different from the rule of the staggering scheme A, which results in side peaks with lower power than the mainlobe.

An embodiment of the staggering format is the same as positioning reference signals (PRS) when $S_{sub}$ is even. For instance, when $S_{sub}$ is 2, 4, 6, the $F_i$ is:

$$F_i = \begin{cases} \text{mod}\left(\dfrac{\text{mod}(i, S_{sub})}{2} + \beta_2, S_{sub}\right), & i \text{ is even} \\ \text{mod}\left(F_{i-1} + \dfrac{S_{sub}}{2}, S_{sub}\right), & i \text{ is odd} \end{cases},$$

where $\beta_2$ is an integer ∈ {0, 1, 2, . . . $S_{sub}$−1} . . . (1)

For scenarios that require a high sensing dynamic range, staggering scheme A achieves extended 2D unambiguous ranges than the staggering scheme B.

For the delay and sum algorithm, in the 2D ambiguity function with a true delay and Doppler pair at (τ, f), the side peak locations are $$\left(\tau + \frac{lT_s}{S_{sub}}, f + \frac{pl}{S_{sub}S_{sym}T} + \frac{k}{S_{sym}T}\right)$$

in the 2D ambiguity functions, except that there are no side peaks at $$\left(\tau, f \pm \frac{1}{T}\right),$$

where 1=−$S_{sub}$,−($S_{sub}$−1), . . . 0, . . . $S_{sub}$−1, $S_{sub}$, k ∈ $\mathbb{Z}$, and (k, 1)≠(0,0).

Similarly, for the periodogram-based algorithm, with a true delay and Doppler pair at (τ, f), the side peak locations are $$\left(\tau + \frac{lT_s}{S_{sub}}, f + \frac{pl}{S_{sub}S_{sym}T} + \frac{k}{S_{sym}T}\right)$$

in the 2D ambiguity functions, where 1=−$S_{sub}$,−($S_{sub}$−1), . . . 0, . . . $S_{sub}$−1, $S_{sub}$, k ∈ $\mathbb{Z}$, and (k,1)≠(0,0).

FIGS. 4a, 4b, 4c, 4d illustrate the 2D ambiguity functions of 2D FFT ($S_{sub}$=8, $S_{sym}$=1, and true delay and Doppler pair (τ, f) is (0, 0)) using different staggering offsets with several examples of 2D unambiguous ranges.

Figure 4A:
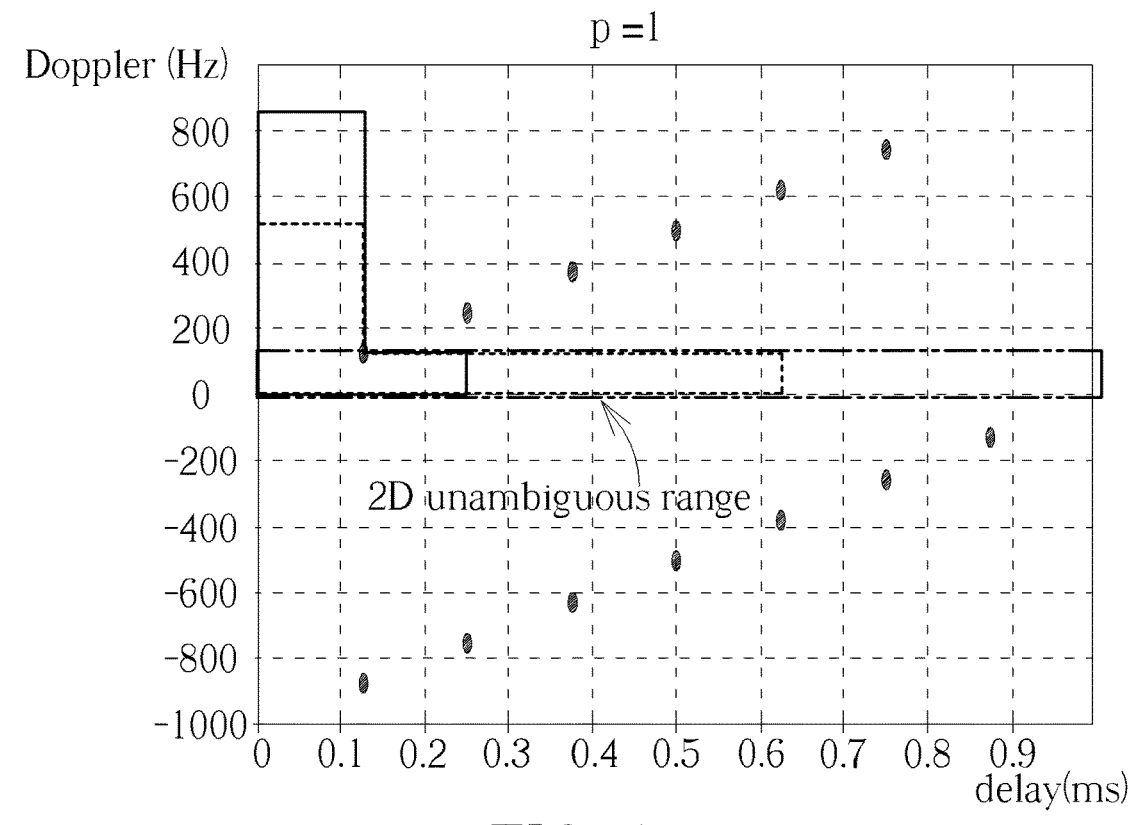
FIGS. 4a, 4b, 4c, 4d are schematic diagrams of results of 2D unambiguous range according to an embodiment of the present invention.
Figure 4B:
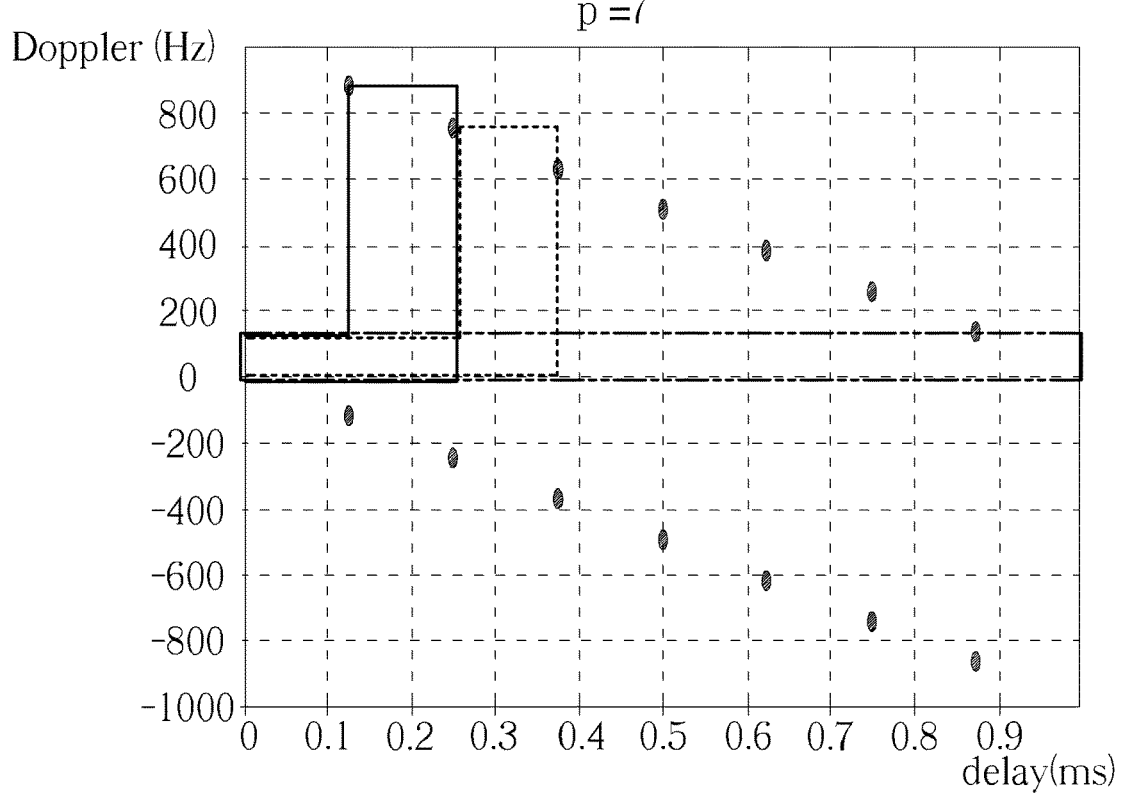
Figure 4C:
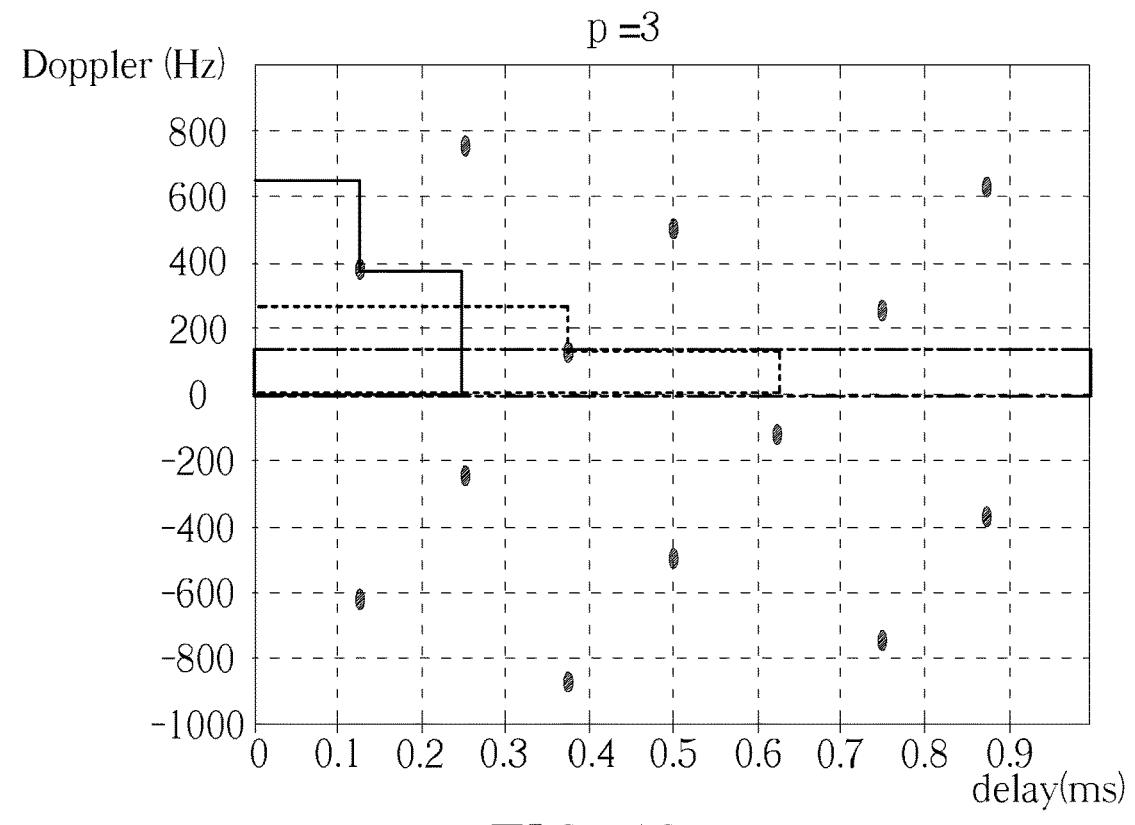
Figure 4D:
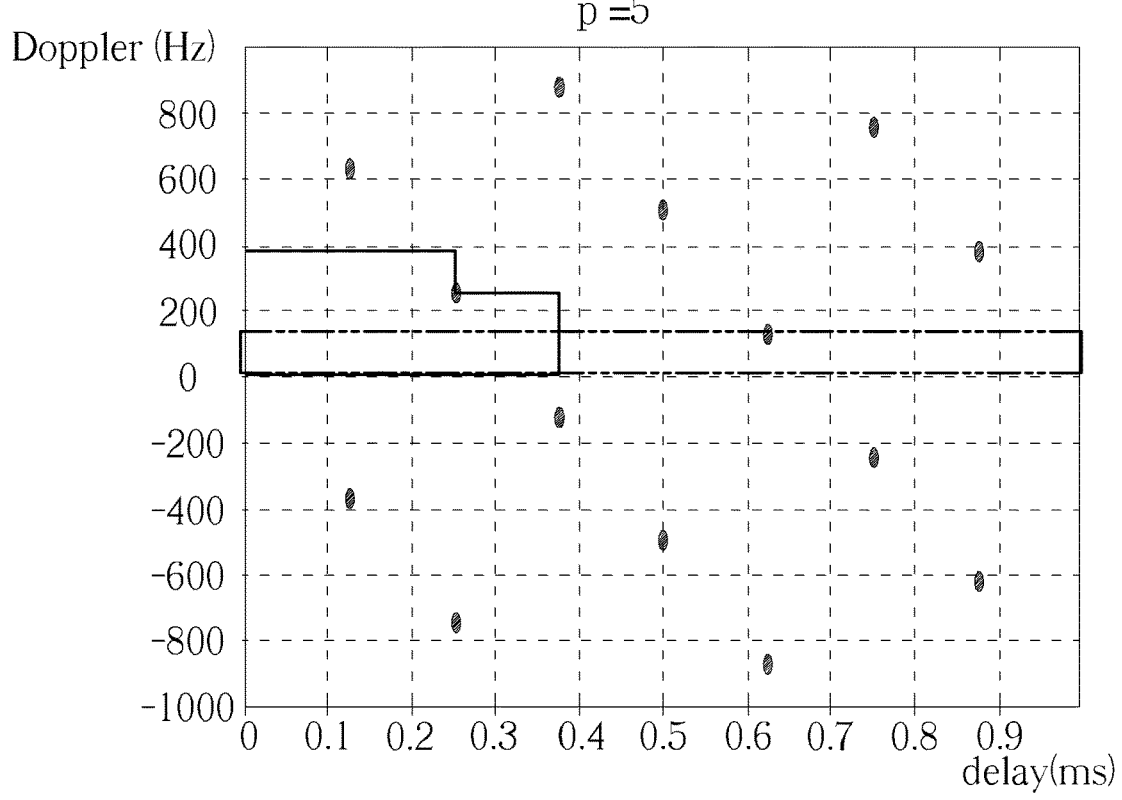

Different line types denote different choices of 2D unambiguous ranges in FIGS. 4a, 4b, 4c, 4d. FIGS. 4a, 4b, 4c, 4d present the results of p=1, 7, 3, 5, respectively. FIGS. 4c and 4d (i.e., p=3,5) show more balanced delay and Doppler ranges in 2D unambiguous ranges than FIGS. 4a and 4b (i.e., p=1, 7). In practice, depending on the application scenario, different values of p may be chosen.

Figure 5A:
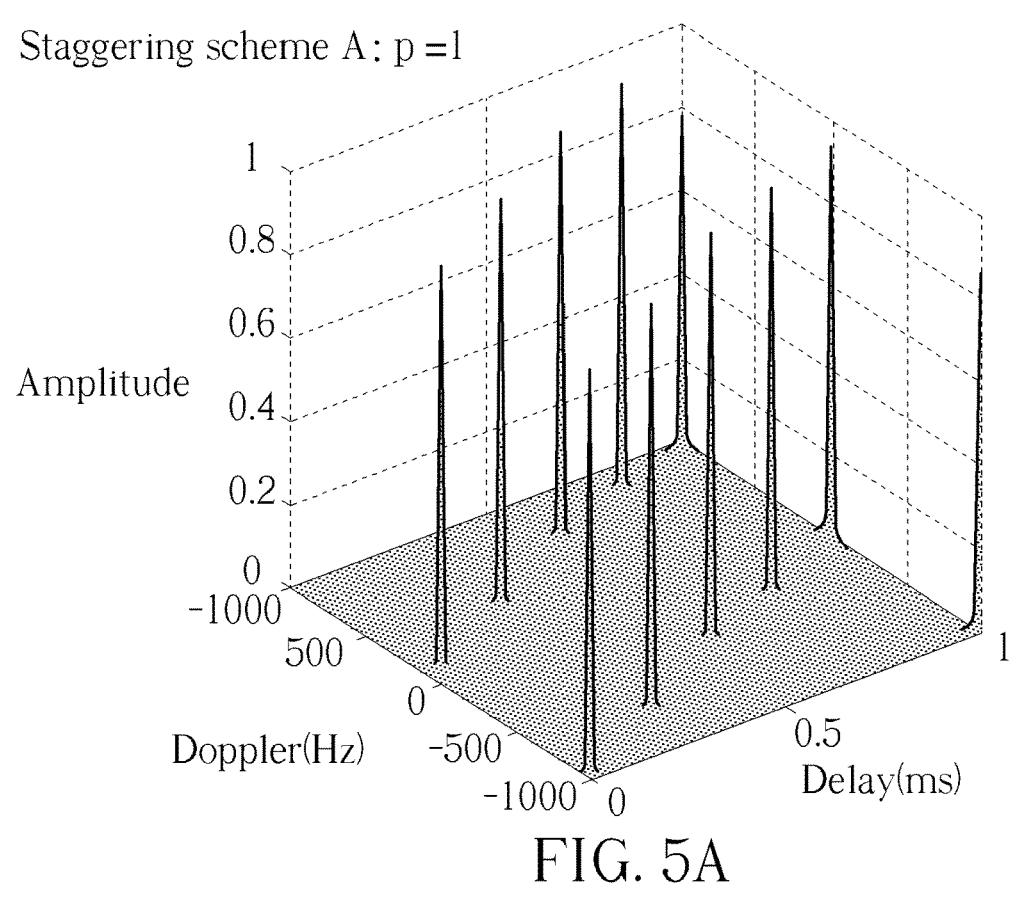
FIGS. 5a, 5b are schematic diagrams of results of 2D unambiguous range according to an embodiment of the present invention.
Figure 5B:
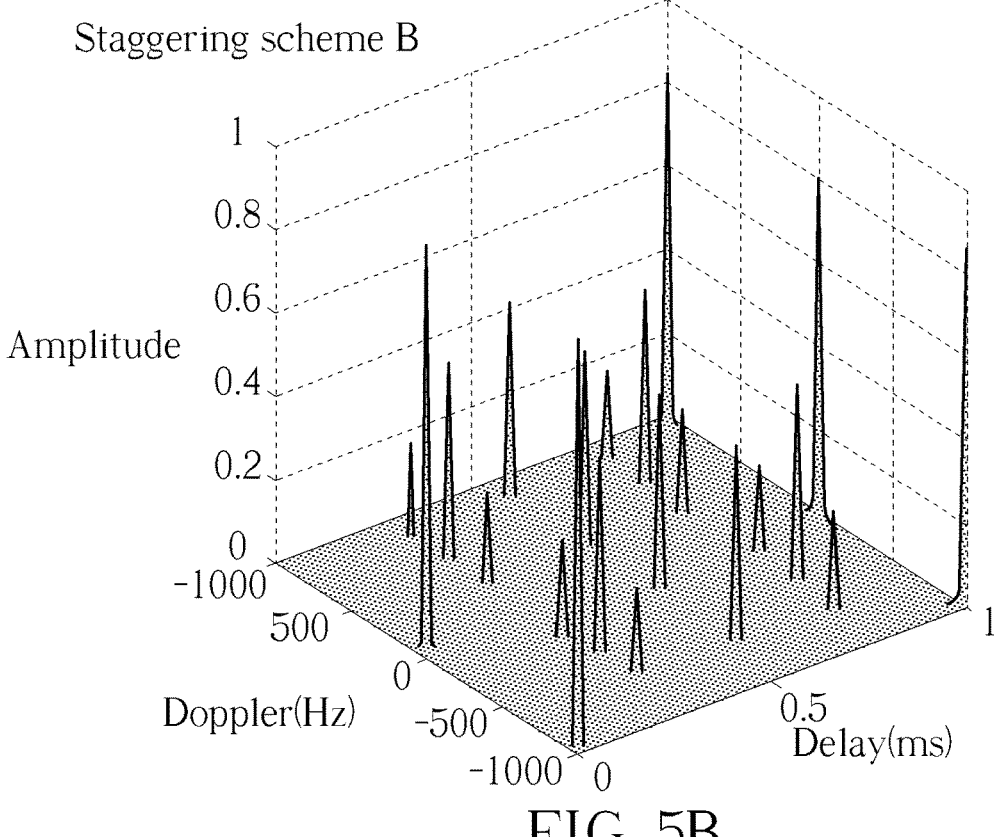

Though staggering scheme B shows worse 2D unambiguous ranges when considering all side peaks, its side peaks have lower power than the side peaks of the staggering scheme A as indicated in FIGS. 5a and 5b.

Therefore, the 2D unambiguous range for delay and Doppler could be extended by slicing off the low-power side peaks, which sacrifices sensing dynamic range of detectable target signal strength.

In addition, CLEAN is an iterative algorithm that finds the target one by one, from the strongest to the weaker ones. It is more suitable for scenarios where the target number is small.

During each iteration of CLEAN, the strongest target is deducted from the cost function, and its associated side peaks with lower power are removed. Therefore, CLEAN can eliminate the impact of side peaks in staggering scheme B since the main peak has the strongest power and can be identified as the strongest target, and the performance of staggering scheme B using CLEAN is better than the performance of staggering scheme A.

Therefore, according to the above embodiments of the configurations, the criteria of choosing reference signal patterns using different sensing algorithms and applies the derived principles to either new 6G joint communication sensing, or improvement over existing 5G NR, reference signal (RS) patterns.

Notably, those skilled in the art may properly design the joint communication and sensing method and the UE according to different system requirements, which are not limited thereto.

In summary, the present invention provides a joint communication and sensing method and related user equipment (UE) for an orthogonal frequency domain multiplexing (OFDM) communication system to improve the ambiguity performance of sensing algorithms and suggest different staggering schemes for the sensing algorithms and application scenarios.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joint communication and sensing method for an orthogonal frequency domain multiplexing (OFDM) communication system, comprising:

determining a staggering offset format for an OFDM reference signal (RS) symbol; and eliminating a time delay ambiguity in a two-dimension (2D) range with the determined staggering offset format;

wherein the OFDM RS symbol is of a comb structure;

wherein $S_{sub}$ unit in a subcarrier number denotes a spacing of a plurality of non-zero resource elements (RE) in a frequency domain, $S_{sym}$ unit in a symbol number denotes the spacing of the RS symbol in the time domain, $F_i$ unit in a subcarrier numbers denotes a staggering offset in the frequency domain of an $i_{th}$ RS symbol, $T_s$ denotes an OFDM duration, $T_{cp}$ denotes a cyclic prefix (CP) duration, and $T=T_s+T_{cp}$ denotes a sum of the OFDM symbol duration and the CP duration.

2. The joint communication and sensing method of claim 1, wherein mod (Z, $S_{sub}$) $\in$ {0,1, ... $S_{sub}$-1} for any integer Z is defined, where mod is a modulo operation; a first staggering scheme of the staggering offset format satisfies $F_i$=mod (p·i+$\beta_1$, $S_{sub}$), where p is a relative prime to $S_{sub}$ and $\beta_1$ $\in$ {0,1, ... $S_{sub}$-1}, i=0,1, ... ; a second staggering scheme of the staggering offset format satisfies $F_i$ sequence different from the first staggering scheme.

3. The joint communication and sensing method of claim 2, wherein a plurality of side peak locations are $$\left(\tau + \frac{lT_s}{S_{sub}}, f + \frac{pl}{S_{sub}S_{sym}T} + \frac{k}{S_{sym}T}\right)$$

in a 2D ambiguity function, except that there are no side peaks at $$\left(\tau, f \pm \frac{1}{T}\right),$$

where l=−$S_{sub}$, −($S_{sub}$-1), ... 0, ... $S_{sub}$-1, $S_{sub}$, k $\in$ $\mathbb{Z}$, , and (k,l)≠(0,0) for a delay and sum algorithm in the 2D ambiguity function with a true delay and Doppler pair at ($\tau$, f), when the staggering offset format satisfies the first staggering scheme.

4. The joint communication and sensing method of claim 2, wherein a plurality of side peak locations are $$\left(\tau + \frac{lT_s}{S_{sub}}, f + \frac{pl}{S_{sub}S_{sym}T} + \frac{k}{S_{sym}T}\right)$$

in a 2D ambiguity function, where l=−$S_{sub}$, −($S_{sub}$-1), ... 0, ... $S_{sub}$-1, $S_{sub}$, k $\in$ $\mathbb{Z}$, , and (k,l)≠(0,0) for a periodogram-based algorithm in the 2D ambiguity function with a true delay and Doppler pair at ($\tau$, f)), when the staggering offset format satisfies the first staggering scheme.

5. The joint communication and sensing method of claim 2, wherein the 2D unambiguous range for delay and Doppler is extended by slicing off at least a low-power side peak, when the staggering offset format satisfies the second staggering scheme.

6. The joint communication and sensing method of claim 2, wherein an iterative algorithm CLEAN is utilized for eliminating an impact of at least a side peak by deducting a strongest target from a cost function and removing its associated side peak with lower power, when the staggering offset format satisfies the second staggering scheme.

7. A user equipment (UE) of an orthogonal frequency domain multiplexing (OFDM) communication system, comprising:

a wireless transceiver, configured to perform wireless transmission and reception to and from a service network; and a controller, configured to determine a staggering offset format for an OFDM reference signal (RS) symbol; and eliminate a time delay ambiguity in a two-dimension (2D) range with the determined staggering offset format;

wherein the OFDM RS symbol is of a comb structure;

wherein $S_{sub}$ unit in a subcarrier number denotes a spacing of a plurality of non-zero resource elements (RE) in a frequency domain, $S_{sym}$ unit in a symbol number denotes the spacing of the RS symbol in the time domain, $F_i$ unit in a subcarrier numbers denotes a staggering offset in the frequency domain of an $i_{th}$ RS symbol, $T_s$ denotes an OFDM duration, $T_{cp}$ denotes a cyclic prefix (CP) duration, and $T=T_s+T_{cp}$ denotes a sum of the OFDM symbol duration and the CP duration.

8. The UE of an OFDM communication system of claim 7, wherein mod $(Z, S_{sub}) \in \{0,1, \ldots S_{sub}-1\}$ for any integer Z is defined, where mod is a modulo operation; a first staggering scheme of the staggering offset format satisfies $F_i=\text{mod} (p \cdot i+\beta_1, S_{sub})$, where p is a relative prime to $S_{sub}$ and $\beta_1 \in \{0,1, \ldots S_{sub}-1\}$, $i=0,1, \ldots$ ; a second staggering scheme of the staggering offset format satisfies $F_i$ sequence different from the first staggering scheme.

9. The UE of an OFDM communication system of claim 8, wherein a plurality of side peak locations are $$\left(\tau + \frac{lT_s}{S_{sub}}, f + \frac{pl}{S_{sub}S_{sym}T} + \frac{k}{S_{sym}T}\right)$$

in a 2D ambiguity function, except that there are no side peaks at $$\left(\tau, f \pm \frac{1}{T}\right),$$

where $l=-S_{sub}, -(S_{sub}-1), \ldots 0, \ldots S_{sub}-1, S_{sub}, k \in \mathbb{Z}$, and $(k,l) \neq (0,0)$ for a delay and sum algorithm in the 2D ambiguity function with a true delay and Doppler pair at $(\tau, f)$, when the staggering offset format satisfies the first staggering scheme.

10. The UE of an OFDM communication system of claim 8, wherein a plurality of peak locations are $$\left(\tau + \frac{lT_s}{S_{sub}}, f + \frac{pl}{S_{sub}S_{sym}T} + \frac{k}{S_{sym}T}\right)$$

in a 2D ambiguity function, where $l=-S_{sub}, -(S_{sub}-1), \ldots 0, \ldots S_{sub}-1, S_{sub}, k \in \mathbb{Z}$, , and $(k,l) \neq (0,0)$ for a periodogram-based algorithm in the 2D ambiguity function with a true delay and Doppler pair at $(\tau, f),)$, when the staggering offset format satisfies the first staggering scheme.

11. The UE of an OFDM communication system of claim 8, wherein the 2D unambiguous range for delay and Doppler is extended by slicing off at least a low-power side peak, when the staggering offset format satisfies the second staggering scheme.

12. The UE of an OFDM communication system of claim 8, wherein an iterative algorithm CLEAN is utilized for eliminating an impact of at least a side peak by deducting a strongest target from a cost function and removing its associated side peak with lower power, when the staggering offset format satisfies the second staggering scheme.

\* \* \* \* \*